United States Statutory Invention Registration [19]

[11] Reg. Number: H335

Milberger et al. [43] Published: Sep. 1, 1987

[54] CONVERTER

[75] Inventors: Walter E. Milberger; Donald C. Lewns, both of Severna Park; David E. Bulgher, Ellicott City, all of Md.

[73] Assignee: The United States of America as respresented by the Secretary of the Army, Washington, D.C.

[21] Appl. No.: 32,406

[22] Filed: Mar. 27, 1987

[51] Int. Cl.[4] ..... H02N 3/335

[52] U.S. Cl. ..... 363/16; 363/17; 363/56; 363/72

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An electrical power converter comprising two current-fed square wave choppers the outputs of which are combined and rectified to yield a variable and regulated output voltage. The phase relationship of the choppers are varied to achieve output voltage control and regulation. The chopper outputs are combined in such a way that the choppers never experience the open-circuit inductance of their output transformers. This enhances frequency agility. A novel choke feed system is provided in which the choke flyback energy is absorbed and then transferred to the input of the other chopper.

7 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONVERTER

The Government has rights in this invention pursuant to contract DAAK11-81-C-0021, awarded by the Dept. of the Army.

BACKGROUND OF THE INVENTION

The field of this invention is electrical power converters and more particularly to such converters capable of converting an unregulated dc voltage to a variable and regulated dc voltage. Prior art converters of these types have included one or more full or half bridge choppers comprising four switching transistors which are rendered conducting in pairs to periodically reverse the current through a transformer primary and thus produce a secondary voltage which is then rectified to produce the output voltage. The duty cycle of the transistors may be controlled by a feedback circuit to regulate the output voltage. A slight delay in the switching off of any of these transistors, for example caused by stored charge in the transistor collector-to-emitter junction leads to a situation known as "switch-through", wherein two series-connected transistors will short the input voltage, which can lead to destructive current flow. To limit these short-circuit currents, current-limiting inductors have been used in series with the input voltage supply. These inductors however produce a high flyback voltage each time the current therethrough is switched off and this occurs at least once for every chopper cycle. This flyback voltage can cause transistor and inductor failure because of its high amplitude, and it can result in inefficiency especially in high frequency systems since the energy stored in the inductor's magnetic field is normally dissipated at least once during each chopper cycle. A Bell Telephone Lab circuit with a single choke in series with the input converter chopper negated the effects of transistor switch-through and also provided current limiting for transient load shorts. That circuit however has the disadvantage that a flyback voltage proportional to L di/dt appears on top of the chopper dc output. To prevent these large flyback voltages from causing the chopper transistors to go into first avalanche, the choke must be shunted by a dissapative snubber.

A more efficient means of clamping the flyback voltage is to use an energy recovery circuit that utilizes the primary of a transformer as a current-limiting inductor with one terminal of the secondary thereof having a diode connected to the B+ or converter input voltage in such a polarity that the flyback voltage in excess of twice B+ is fedback to the B+ sink. In some applications a flyback voltage of twice B+ cannot be tolerated.

Prior art chopper switching regulators (or pulse-width regulators) vary the output voltage by changing the duty cycle or "on" time of a switch which feeds the load through a transformer. During the "off" time of the switch the load is thus isolated from the remainder of the circuitry. This situation results in two disadvantages, (1) the $I^2xR$ loss associated with the effective series impedance of the switch increases as the inverse of the deviation. This is undesirable when high efficiency is required over a large range of load conditions, as required for example by many space programs; (2) immediately following the opening of the switch, the energy stored in the output transformer generates a voltage transient across the switch which is proportional to the switching current times the transitional open-circuit inductance of the transformer. This causes both first and second avalanche of the switching transistors. Since the transition from leakage to open-circuit inductance is reflected during this period, extensive snubber networks must be used to correct for the large current phase lag so generated. These conditions make for poor reliability and reduce the converter efficiency.

In contrast, in the present invention, the converter utilizes two or more current-fed square wave choppers of variable relative phase, with the outputs thereof combined by series-connected transformer secondary windings. Thus the peak current is little more than the average current over the full 180 degrees of deviation. One of the two choppers is always connected to the load and thus the high open-circuit inductance of the transformer windings is never present. This circuitry eliminates the aforementioned disadvantages of the prior art.

SUMMARY OF THE INVENTION

The novel converter of the present invention comprises two or more current-fed square wave choppers whose phase relationship may be varied over 180°. When the outputs of two such choppers are combined by separate series-connected secondary transformer windings, the average output voltage may be varied from zero to twice the square wave amplitude as the relative chopper phases are varied. This new converter differs from the old phase controlled SCR converters in that it provides frequency agility and in-line current limiting at high efficiency over a wide bandwidth. Output voltage regulation is provided by a conventional feedback circuit which compares the output voltage to a reference voltage to yield an error signal which changes the chopper phases in such a direction as to reduce the error voltage to zero. This feedback circuit thus compensates for both input and load circuit voltage fluctuations.

The current-limiting feature comprises a novel energy recovery choke feed system comprising current-limiting chokes between the input B+ voltage and each of the two choppers, with a diode and capacitor connected to each of the chokes to absorb the flyback energy thereof, and means to apply the flyback energy accumulated on each of the capacitors to the opposite chopper input, thus uitilizing the flyback energy with a resultant increase in efficiency.

It is thus an object of the invention to provide a converter of the type described which is highly reliable and efficient, has fast response, is RFI quiet and which has unity peak-to-average current load/line reflection.

Another object of the invention is to provide a phase-control converter comprising reference and control square wave choppers with a novel means of coupling the outputs thereof in such a way that time domain modulation of the relative chopper phase results in output amplitude control.

A still further object is to provide a converter of the type described in which high voltage transients across the switching transistors are eliminated.

These and other advantages and objects of the invention will become apparent from the following detailed description and the drawings.

DETAILED DESCRIPTION OF A PREFERRED EMBODIMENT

The present converter has been named after the principal inventor thereof, continuing a tradition of associating inventors with their significant inventions, e.g., the Venable converter and the Cûk converter. Each of these prior art converters plus the others mentioned above contributed to power supply technology yet none satisfy all the demands of military and commercial users. In both military and commercial applications, reliability is most important and high efficiency is required to conform either to the prime power restraint or economic profile. Size and weight are important in aerospace environments. Many coherent radars require the converter chopper frequency to be at the fundamental or a multiple of the system pulse repetition frequency (PRF) to meet stringent microwave stability requirements. These PRFs may vary from tens of kHz to more than one MHz. To satisfy all these demands, the Milberger Converter was developed. The performance of the circuit design was verified by modeling a 2,500 watt, 24,000 volt converter regulator operating from a three-phase, 400 Hz rectified line. The chopper frequency was chosen as 150 kHz plus or minus 30 kHz to be in compliance with the PRF lock-up requirement of a developmental radar transmitter. At this load, a regulated efficiency of 90% was obtained with an input line variation of 230–300 volts. At a chopper frequency of one MHz, 76% efficiency was obtained for a 100 ampere, 5 volt load, over an input voltage range of 240–300. These figures are impressive in comparison to those obtained with prior art designs.

The present invention comprises a new buck-boost phase control converter characterized by all of the above desirable features. The Milberger Converter differs from prior art converters in that modulation (or voltage control) is achieved by magnetic rather than active means, and the new design virtually eliminates voltage transients generated by the open-circuit inductance inherent in most single conversion regulated power supplies. From all indications, the reliability, efficiency and performance of the Milberger converter at high chopper frequencies is equal to or better than prior art converters operating at lower frequencies.

Figure 1:
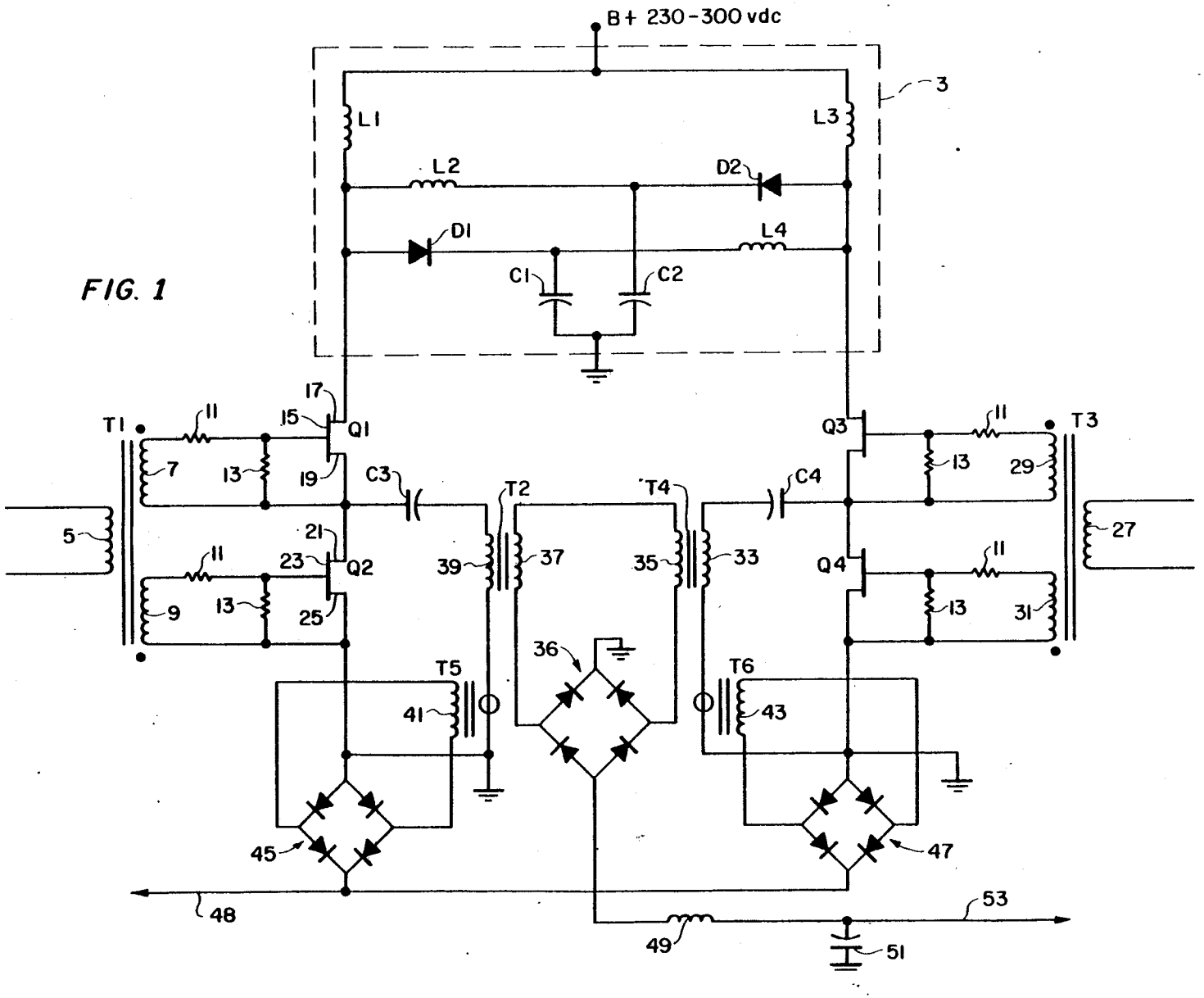
FIG. 1 is a schematic of an embodiment of the invention.

The converter of FIG. 1 is designed to operate at a chopper frequency of one MHz and to produce a minus 5 volt output. It uses a pair of half-bridge choppers and thus is one of the simplest embodiments of the invention.

The output transformers T2 and T4 are driven by the two choppers. The reference phase drive is supplied by the left-hand or reference chopper through transformer T1 and the variable control phase drive is supplied to the right-hand or control chopper through transformer T3. The reference drive comprises an amplified clock signal and the control drive an amplified but variable phase version of the same clock signal. Since both drive signals are square waves, transformer saturation and gate or base drive asymmetry experienced in pulse-width modulated converters is not a problem. Also, in this circuit, no snubber or commuting diodes are required.

The reference phase chopper comprises FETs Q1 and Q2, capacitor C3, drive transformer T1, output transformer T2 and current transformer T5 with its bridge rectifier 45. The control phase chopper is similar and comprises Q3, Q4, T3, T4, T6 and 47. The rectified, 400 Hz, B+ input voltage, which can vary from 230–300 volts dc is applied in parallel to both choppers through an energy recovery choke feed system 3, to be subsequently described. The secondary 7 of T1 is connected to the gate 15 of Q1 and the secondary 9 of the same transformer is connected to the gate 23 of Q2. Q1 and Q2 are connected in series via their source and drain terminals, as shown, from the B+ terminal, via choke L1, to ground. The junction of the two transistors Q1 and Q2 has one terminal of capacitor C3 connected thereto, with the other terminal thereof connected to the primary 39 of the output transformer T2. The other end of primary 39 is grounded through the primary of current transformer T5. The reference drive signal applied to the primary 5 of T1 alternately renders Q1 and Q2 conductive. When Q1 is conducting, current flows from B+ through Q1, C3 and the primary 39 to ground. On the next half cycle of the drive signal, Q1 will become non-conducting, and Q2 will conduct and will shunt to ground the voltage built up on C3 during the previous half cycle when Q1 was conducting. This will produce a current of opposite polarity in the primary 39. The series and paralleled resistors 11 and 13 in the FET gate circuits of both choppers prevent parasitic oscillation of the transistors in the absence of gate drive signals, as would be experienced during converter inhibit modes.

The control phase chopper functions in the same way as the reference phase chopper to provide square waves of current through the primary 33 of its output transformer T4. The secondaries 37 and 35 of T2 and T4 are connected in series across one diagonal of rectifier bridge 36, the other diagonal of which has its positive terminal grounded and its negative terminal connected to a filter comprising series choke 49 and shunt capacitor 51. The negative output voltage appears on line 53.

The illustrated circuitry provides for a wide range of output voltage by varying the phase of the drive to the control phase chopper. If the drive to the control phase chopper is 180° from that applied to the reference phase chopper, the voltages in the secondary windings 35 and 37 will be out of phase and will cancel to yield zero output. If the two signals are in phase, the secondary voltages will add to yield maximum output. Intermediate drive phase differences will yield intermediate output voltages. The control phase is determined by the feedback circuit of FIG. 3, to be described.

The series-connected secondaries 35 and 37 combined with the full wave bridge rectifier 36 has an important advantage in that one or the other of the choppers is always supplying current to the output via bridge 36 and the output from each chopper must pass through the series-connected secondary of the opposite chopper. Thus both of the secondaries are constantly carrying load current. This means that the choppers never experience the open-circuit inductance of their output transformers, but see only the leakage inductance thereof. Since leakage inductance is much smaller than open-circuit inductance, the frequency response of this circuit is greatly enhanced. This means that the converter can be programmed to rapidly switch to numerous different output voltages, which is an important capability in many radar applications.

Figure 2:
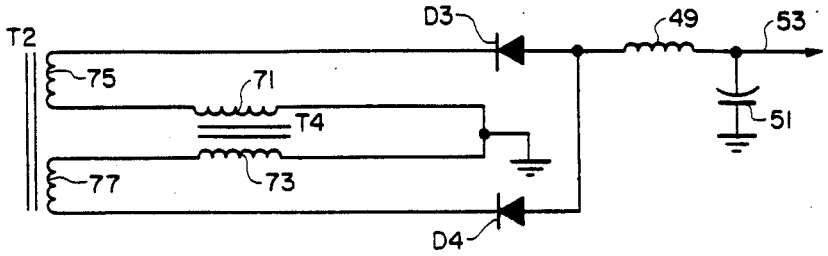
FIG. 2 shows alternate circuitry for a part of the circuit of FIG. 1.

An alternate output circuit which has the same advantages is shown in FIG. 2. This circuit requires only two rectifier diodes D3 and D4, arranged to provide full wave rectification of the outputs of T2 and T4. The secondary of T2 comprises two windings 75 and 77 and the secondary of T4 comprises two windings 71 and 73. As shown, pairs of series-connected winding, one from each transformer are connected to a different one of the rectifier diodes, and the rectified negative voltage is applied to the filter comprising inductor 49 and capacitor 51. In this alternate embodiment, it can be seen that the output of each chopper passes through the output transformer of the other chopper to maintain constant load current through both transformers. The primary windings 37 and 35 of T2 and T4, not shown in FIG. 2, would be the same as those of FIG. 1.

Figure 3:
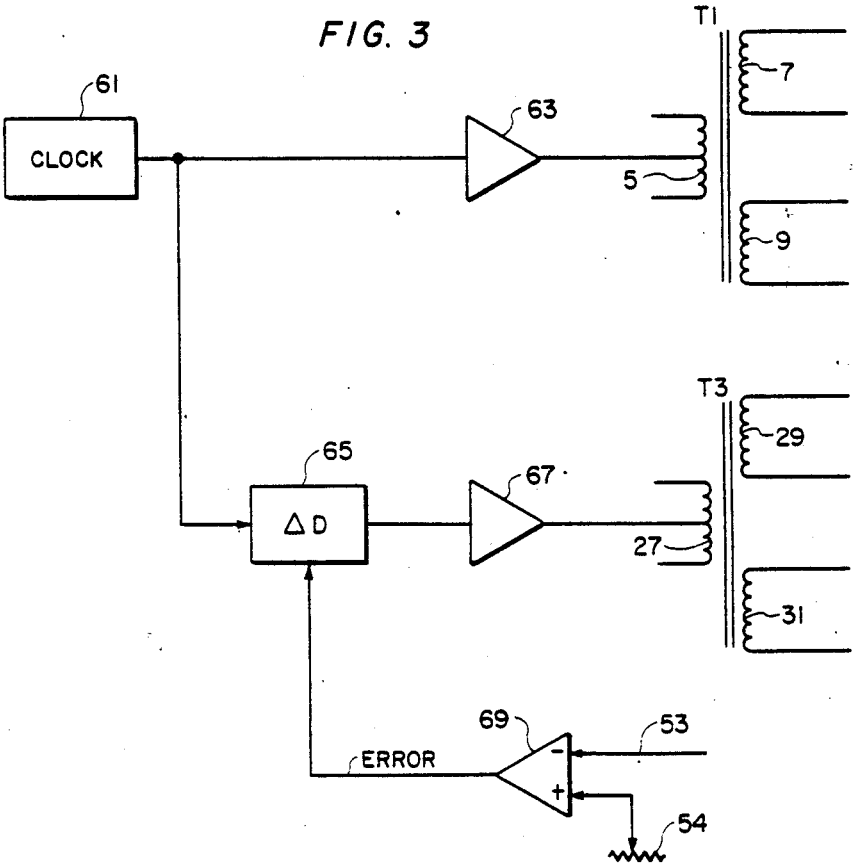
FIG. 3 shows a control circuit which can be used with the circuit of FIG. 1.

FIG. 3 shows a feedback circuit which may be used with the converter of FIG. 1. The clock 61, which in this example operates at one MHz, is applied to the primary 5 of T1 via driver amplifier 63 to provide the reference drive signal for the reference chopper. The clock output is also applied to variable delay circuit 65, the delay of which can be varied by up to one-half the clock period by means of an error signal applied thereto by differential amplifier 69. The inputs of amplifier 69 are the output voltage of the converter from line 53 of FIG. 1 and a reference voltage from control 54. The output of delay circuit 65 is amplified by driver amplifier 67 and applied to the primary of T3 to form the control drive to the control chopper. The circuit will adjust the phase difference between the two drive signals until the error voltage is minimized and thus the two inputs of amplifier 69 are approximately the same. The control 54 may be manually or automatically varied to change the output voltage. This feedback control circuit per se is not novel.

The two current transformers T5 and T6 of FIG. 1 are part of a logic overload inhibit circuit which automatically corrects for current overloads. The outputs of the two bridge rectifiers 45 and 47 are both connected to line 48 which is applied to a control circuit, not shown. It was found that this over-current control system did not act fast enough for certain current overloads and it was found necessary to provide the choke feed input system 3 to limit the current until such time as the logic overload inhibit circuit becomes effective. The circuit within dashed box 3 of FIG. 1 provides this current limitation for both switchthrough and longer transient conditions with small loss and no voltage transients or spikes.

The choke feed system 3 comprises current-limiting inductors L1 and L3 in series respectively with the inputs of the reference phase and control choppers, with diode D1 and capacitor C1 series connected from the input of the reference chopper to ground and diode D2 and capacitor D2 similarly connected to the control chopper. The inductor L2 connects the junction of D2 and C2 to the reference chopper input and inductor L4 connects the junction of D1 and C1 to the control chopper input. In normal operation, in the absence of switchhrough, both C1 and C2 become charged to almost B+ through their respective diodes. If switchthrough occurs in the reference chopper, for example, both Q1 and Q2 would be conductive, permitting high current to build up in L1. Upon the cessation of the switchthrough, the magnetic field in L1 would rapidly collapse, giving rise to a large voltage spike (or flyback voltage) proportional to L1 di/dt. This spike will make the anode of D1 more positive than B+ and thus the spike will be passed to C1, which will become slightly higher in voltage than B+. This excess voltage on C1 will be applied to the opposite chopper input via choke L4, so that the flyback energy is utilized or recovered and efficiency enhanced. Even in the absence of switchthrough, each time that Q1 is switched off by its drive signal, a smaller spike will be generated at the anode of D1 and it will also be absorbed and transferred to the opposite chopper by this circuit. D2, C2 and L2 function in the same way to absorb spikes from L3 and transfer the energy therein to the reference chopper input.

While the invention has been described in connection with illustrative embodiments, obvious variations therein will occur to those skilled in the art, accordingly the invention should be limited only by the scope of the appended claims.

What is claimed is:

1. An electrical power converter comprising; two current fed square wave choppers the phase relationships of which may be varied over 180 degrees to achieve output voltage control and regulation, means to drive one of said choppers by means of an amplified square wave clock signal and means to drive the other of said choppers with an amplified and variable-phase version of the said clock signal, means to combine the outputs of said choppers by means of two series-connected windings of two different transformers, the primaries of which are driven by said choppers, said series-connected windings being connected to a full-wave bridge rectifier which provides the converter output.

2. The converter of claim 1 further comprising; a current limiting choke feed system with an energy recovery feature, comprising; separate current-limiting chokes in series with the inputs of both of said choppers, a series diode-capacitor connected across said choppers in such a way that the flyback voltage generated across said chokes will be absorbed by the said capacitors, and means to transfer the energy so absorbed to the input of the opposite one of said choppers.

3. The converter of claim 1 wherein said choppers comprise half-bridge circuits.

4. An electrical power converter comprising; a reference phase chopper and a control phase chopper, the phase relationships of which may be varied to achieve output voltage control and regulation, a fixed-phase drive signal connected to said control phase chopper, each of said choppers having its output connected to the primary of an output transformer, said output transformers having one or more secondary windings, means to connect said secondary windings to each other and to rectifier means in such a way that load current is constantly flowing through all of said secondary windings, whereby said choppers never experience the open circuit inductance of said output transformers.

5. The converter of claim 4 wherein each of said output transformers comprise two secondaries and said rectifier means comprises two diodes, and wherein pairs of said secondaries are each connected in series and to a different one of said rectifier diodes, and wherein said pairs each comprise one winding from each of said output transformers.

6. A choke feed system for an electrical converter which comprises two square wave choppers both of which convert an input dc B+ voltage to an alternating voltage, comprising; separate current-limiting chokes in series with the inputs of both said choppers, a series diode and capacitor connected across each of said choppers in such a way that the flyback voltage generated across said chokes will be absorbed by said capacitors, and means to transfer the flyback energy so absorbed to the input of the other one of said choppers.

7. The choke free system of claim 6 wherein said last-named means comprises inductors connected from the junctions of said diodes and capacitors to the input of the opposite one of said choppers.

* * * * *